United States Patent
Aslanov et al.

(10) Patent No.: US 11,079,571 B2
(45) Date of Patent: Aug. 3, 2021

(54) LASER PROCESSING APPARATUS

(71) Applicant: Samsung Display Co. Ltd., Yongin-si (KR)

(72) Inventors: Emil Aslanov, Asan-si (KR); Je Kil Ryu, Yongin-si (KR); Hae Sook Lee, Hwaseong-si (KR); Kyung Hoon Chung, Seongnam-si (KR); Gyoo Wan Han, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 718 days.

(21) Appl. No.: 15/793,698

(22) Filed: Oct. 25, 2017

(65) Prior Publication Data

US 2018/0157006 A1    Jun. 7, 2018

(30) Foreign Application Priority Data

Dec. 6, 2016    (KR) .................. 10-2016-0165113

(51) Int. Cl.
*G02B 13/00* (2006.01)
*B23K 26/06* (2014.01)
(Continued)

(52) U.S. Cl.
CPC ...... *G02B 13/0005* (2013.01); *B23K 26/0643* (2013.01); *B23K 26/082* (2015.10);
(Continued)

(58) Field of Classification Search
CPC ............ B23K 26/067; B23K 26/082; B23K 26/0613; B23K 26/0622; B23K 26/0608;
(Continued)

(56) References Cited

U.S. PATENT DOCUMENTS 4,974,919 A * 12/1990 Muraki ............... G03F 7/70075
353/122
7,714,249 B2 * 5/2010 Nomaru ................. B23K 26/04
219/121.62
(Continued)

FOREIGN PATENT DOCUMENTS

CN    102809804    8/2014
JP    2008279472    11/2008
(Continued)

*Primary Examiner* — Christopher M Koehler
*Assistant Examiner* — Chris Q Liu
(74) *Attorney, Agent, or Firm* — Cantor Colburn LLP

(57) ABSTRACT

A laser processing apparatus includes a laser source which generates a laser beam; a scanner unit disposed in an optical path of the laser beam from the laser source and which adjusts the optical path of the laser beam from the laser source in a first direction or in a second direction different from the first direction; and a reflector unit disposed in an optical path of the laser beam adjusted by the scanner unit and which reflects the laser beam adjusted by the scanner unit, where the reflector unit includes a first sub-reflector unit which shifts an optical path of the laser adjusted by the scanner unit in the first direction, and a second sub-reflector unit which shifts an optical path of the laser beam adjusted by the scanner unit in a third direction opposite to the first direction.

10 Claims, 20 Drawing Sheets

(51) Int. Cl.
  *G02B 26/10* (2006.01)
  *B23K 26/082* (2014.01)
  *G02B 27/10* (2006.01)
(52) U.S. Cl.
  CPC ......... *G02B 26/101* (2013.01); *G02B 26/105* (2013.01); *G02B 27/106* (2013.01)
(58) Field of Classification Search
  CPC .............. B23K 26/042; B23K 26/0643; B23K 26/0853; B23K 26/361; B23K 26/04; B23K 26/0604; B23K 26/0624; B23K 26/0648; B23K 26/382; B23K 26/40; B23K 26/0006; B23K 26/043; B23K 26/064; B23K 26/066; B23K 26/0665; B23K 26/0676; B23K 26/0738; B23K 26/08; B23K 26/351; B23K 26/53; B23K 26/00; B23K 26/02; B23K 26/03; B23K 26/032; B23K 26/034; B23K 26/0344; B23K 26/046; B23K 26/048; B23K 26/0617; B23K 26/073; B23K 26/0732; B23K 26/0736; B23K 26/0823; B23K 26/083; B23K 26/10; B23K 26/206; B23K 26/352; B23K 26/362; B23K 26/364; B23K 26/38; B23K 26/389; G02B 26/0816; G02B 26/101; G02B 26/105; G02B 13/0005; G02B 27/144; G02B 26/10; G02B 26/126; G02B 27/0927; G02B 27/0988; G02B 27/106; G02B 13/0095; G02B 13/22; G02B 17/023; G02B 26/0808; G02B 26/0833; G02B 26/123; G02B 26/124; G02B 26/125; G02B 27/0905; G02B 27/0977; G02B 27/10; G02B 27/1093; G02B 27/145; G02B 27/50; G02B 26/1123

USPC ............ 219/121.68, 121.69, 121.67, 121.73, 219/121.77, 121.74, 121.76, 121.78, 219/121.6, 121.62, 121.8, 121.72, 121.75, 219/121.83, 121.61, 121.64, 121.65, 219/121.66, 121.7, 121.71, 121.79, 219/121.81, 162, 68; 359/201.2, 202.1, 359/203.1, 204.1, 206.1
  See application file for complete search history.

(56) References Cited

U.S. PATENT DOCUMENTS

| | | | | |
|---|---|---|---|---|
| 7,817,319 | B2* | 10/2010 | Pinard | B23K 26/082 |
| | | | | 359/202.1 |
| 8,102,581 | B2 | 1/2012 | Voss et al. | |
| 2003/0102291 | A1* | 6/2003 | Liu | B41J 2/162 |
| | | | | 219/121.73 |
| 2004/0047016 | A1* | 3/2004 | Cannon | G02B 26/123 |
| | | | | 359/204.1 |
| 2007/0064291 | A1* | 3/2007 | Kashimura | G02B 26/123 |
| | | | | 359/204.1 |
| 2010/0208319 | A1* | 8/2010 | Kessler | G02B 17/008 |
| | | | | 359/202.1 |
| 2014/0009811 | A1 | 1/2014 | De Loor | |
| 2014/0356987 | A1* | 12/2014 | Lee | H01L 51/56 |
| | | | | 438/15 |
| 2015/0243934 | A1* | 8/2015 | Han | G02B 27/10 |
| | | | | 438/34 |

FOREIGN PATENT DOCUMENTS

| | | |
|---|---|---|
| KR | 1020070004703 | 1/2007 |
| KR | 1020140089071 | 7/2014 |

* cited by examiner

LASER PROCESSING APPARATUS

This application claims priority from Korean Patent Application No. 10-2016-0165113, filed on Dec. 6, 2016, and all the benefits accruing therefrom under 35 U.S.C. 119, the content of which in its entirety is herein incorporated by reference.

BACKGROUND

1. Field

The disclosure relates to a laser processing apparatus.

2. Description of the Related Art

A laser processing apparatus is typically used to cut a material, form a pattern, perform welding, and so on, using a laser beam. The laser beam used during the laser processing typically has a strong directivity and a high density. Particularly, a high-power laser allows for precision processing without affecting the surroundings, and thus it may be used for processing a display panel.

A laser processing apparatus may include a laser source for outputting a laser beam, a laser irradiation unit including a scanner for controlling the irradiation position of the output laser beam and an F-theta lens for condensing the laser beam whose irradiation position has been determined, and a stage on which a subject to be processed is placed.

SUMMARY

In a conventional laser processing apparatus, a scanning line of a laser beam is typically determined by a scanner. However, the width of such a scanning line adjusted by the scanner may be limited. Accordingly, it may not be easy to perform a process with a desired wide processing range with such a scanning line.

Embodiments of the disclosure provide a laser processing apparatus with expanded range of a scanning line, thereby processing a wider range.

According to an embodiment of the invention, a laser processing apparatus includes a laser source which generated a laser beam, a scanner unit disposed in an optical path of the laser beam from the laser source, where the scanner unit adjusts the optical path of the laser beam from the laser source in a first direction or in a second direction different from the first direction, and a reflector unit disposed in an optical path of a laser beam adjusted by the scanner unit, where the reflector unit reflects the laser beam adjusted by the scanner. In such an embodiment, the reflector unit includes a first sub-reflector unit which shifts an optical path of the laser beam adjusted by the scanner unit in the first direction, and a second sub-reflector unit which shifts the optical path of the laser beam adjusted by the scanner unit in a third direction opposite to the first direction.

In an embodiment, the first sub-reflector unit may include a first mirror which reflects the laser beam adjusted by the scanner unit, and a second mirror which reflects the laser beam reflected by the first mirror.

In an embodiment, the first mirror and the second mirror may be disposed in parallel to each other.

In an embodiment, the laser processing apparatus may further include a stage, onto which the laser beam reflected by the reflector unit is incident. In such an embodiment, the first sub-reflector unit may have an inclination of about 45° with respect to a surface of the stage.

In an embodiment, the second sub-reflector unit may include a third mirror which reflects the laser beam adjusted by the scanner unit, and a fourth mirror which reflects the laser beam reflected by the third mirror.

In an embodiment, the third mirror and the fourth mirror may be disposed in parallel to each other.

In an embodiment, the laser processing apparatus may further include a stage, onto which the laser beam reflected by the reflector unit is incident. In such an embodiment, the second sub-reflector unit may have an inclination of about 45° with respect to the stage.

In an embodiment, the first sub-reflector unit and the second sub-reflector unit may have inclinations of opposite signs, respectively.

In an embodiment, the laser processing apparatus may further include a stage, onto which the laser beam reflected by the reflector unit is incident. In such an embodiment, a height of the laser source from the stage may be equal to a height of the scanner unit.

In an embodiment, the laser processing apparatus may further include a stage, onto which the laser beam reflected by the reflector unit is incident. In such an embodiment, the reflector unit may be disposed between the scanner unit and the stage.

In an embodiment, the laser processing apparatus may further include an F-theta lens which adjusts a focal distance of the laser beam to be constant.

According to another embodiment of the invention, a laser processing apparatus includes a stage disposed on an xy plane of an xyz coordinate system, a laser source disposed above the stage, where the laser source generates a laser beam, a first mirror disposed in an optical path of the laser beam from the laser source, where the first mirror adjusts the optical path of the laser beam from the laser source in an x-axis direction, a second mirror disposed in an optical path of the laser beam adjusted by the first mirror, where the second mirror adjusts the optical path of the laser beam adjusted by the first mirror in a y-axis direction, a third mirror disposed on an optical path of the laser beam adjusted by the second mirror, where the third mirror shifts the optical path of the laser beam adjusted by the second mirror in a first direction on the x-axis direction, and a fourth mirror disposed on an optical path of the laser beam shifted by the third mirror, where the fourth mirror shifts the optical path of the laser beam shifted by the third mirror in the first direction.

In an embodiment, the first mirror may rotate discretely to have a plurality of inclinations on the xy plane.

In an embodiment, the second mirror may rotate continuously to have a continuously varying inclination on an xz plane.

In an embodiment, the third mirror may face the second mirror and have a constant inclination with respect to the xy plane.

In an embodiment, the fourth mirror may face the third mirror and have a constant inclination with respect to the xy plane.

In an embodiment, the fourth mirror may have a same inclination with the third mirror.

In an embodiment, the third mirror and the fourth mirror may be disposed in parallel to each other.

In an embodiment, each of the third mirror and the fourth mirror may have an inclination of about 45° with respect to the xy plane.

In an embodiment, the laser processing apparatus may include a fifth mirror disposed in the optical path of the laser beam adjusted by the second mirror and a sixth mirror disposed in an optical path of the laser beam shifted by the fifth mirror. In such an embodiment, the fifth mirror may shift the optical path of the laser beam adjusted by the second mirror in a second direction opposite to the first direction, and the sixth mirror may shift the optical path of the laser beam shifted by the fifth mirror in the second direction.

According to exemplary embodiments of the disclosure, a laser processing may be performed across a wider range even when the scanning width of a scanner is limited.

BRIEF DESCRIPTION OF THE DRAWINGS

The above and other features of the disclosure will become more apparent by describing in detail exemplary embodiments thereof with reference to the attached drawings, in which.

DETAILED DESCRIPTION

Figure 1:
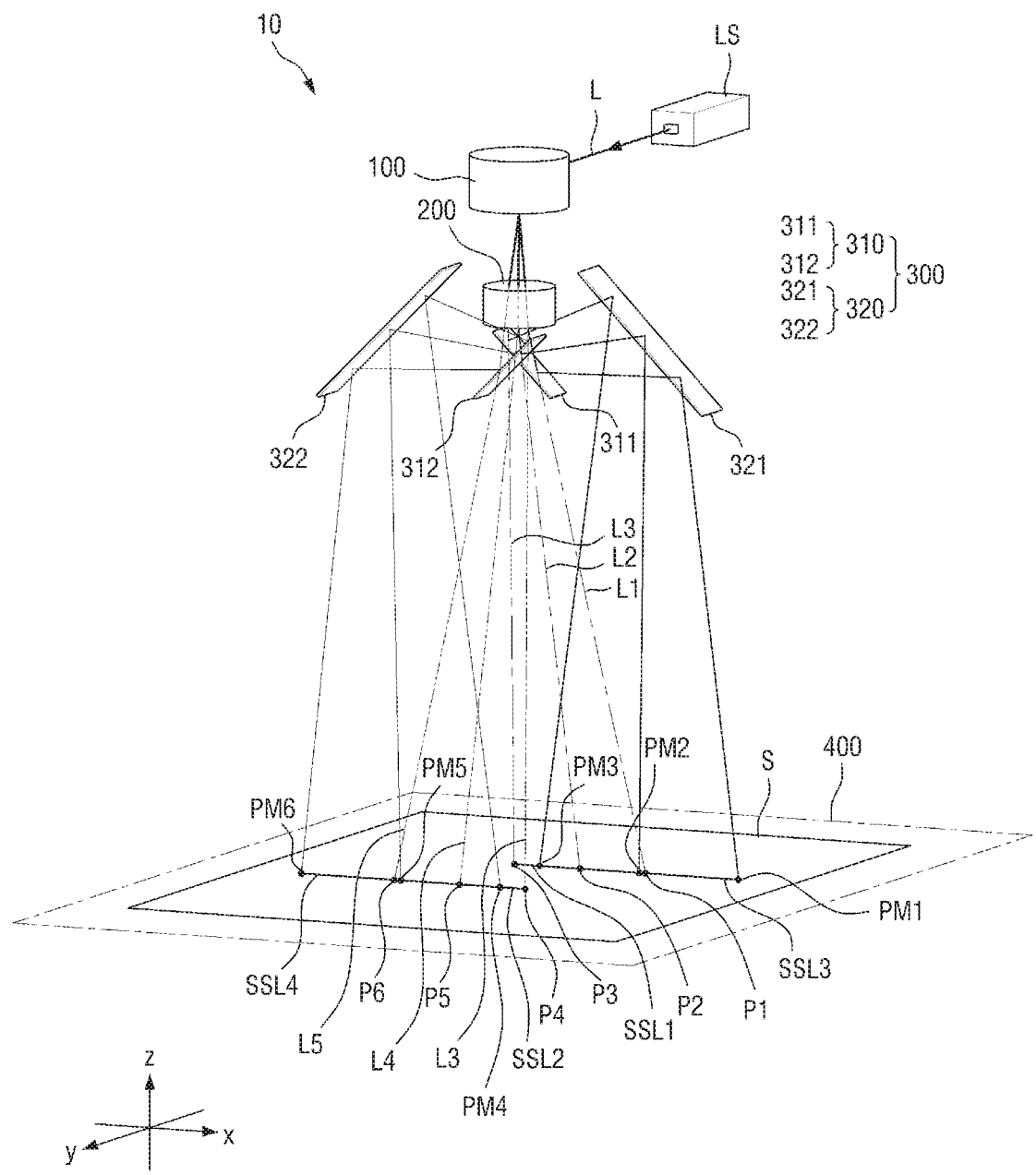
FIG. 1 is a perspective view of a laser processing apparatus according to an exemplary embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the disclosure will be described with reference to the accompanying drawings.

FIG. 1 is a perspective view of a laser processing apparatus according to an exemplary embodiment of the disclosure.

Figure 2:
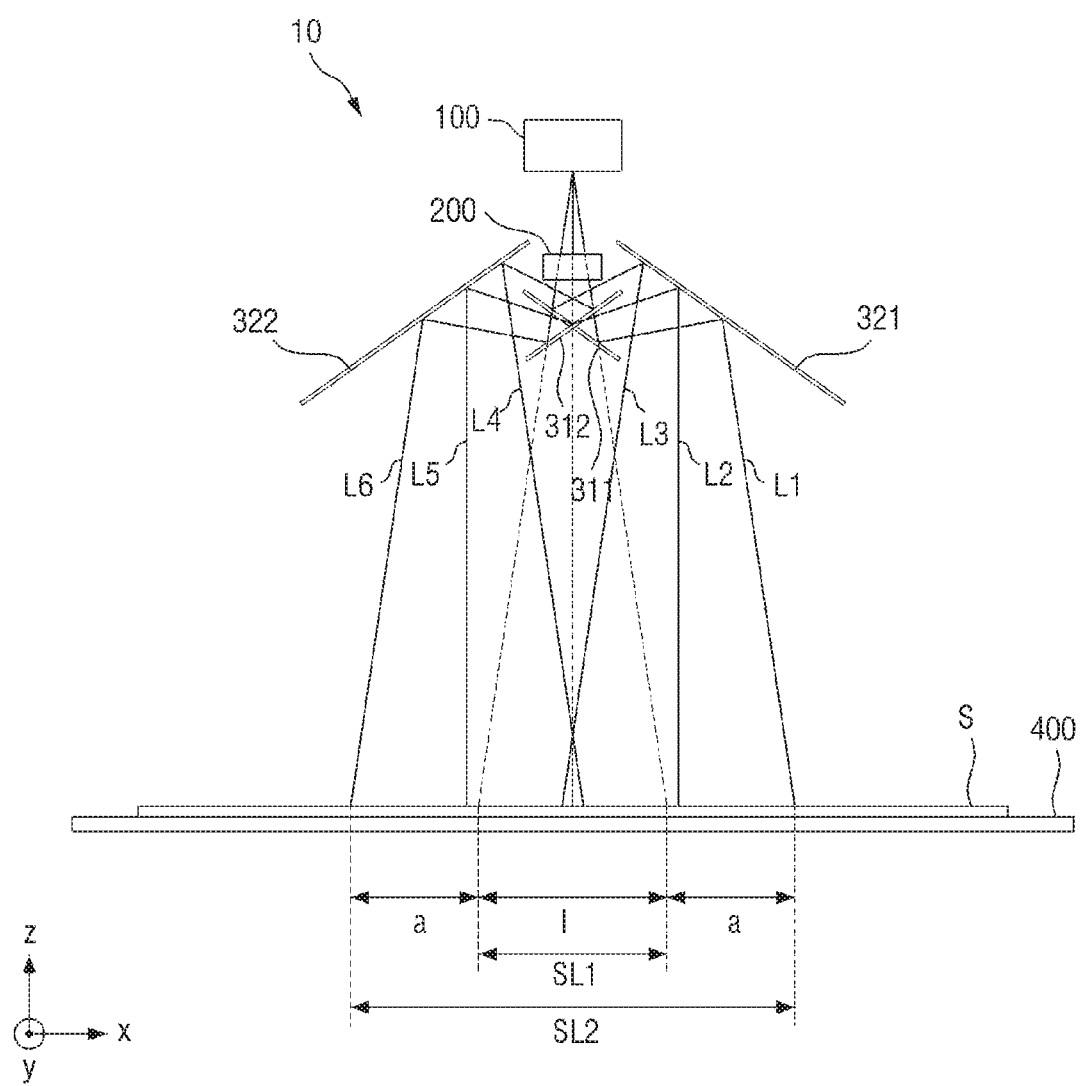
FIG. 2 is a front view of an exemplary embodiment of the laser processing apparatus of FIG. 1.

FIG. 2 is a front view of to an exemplary embodiment of the laser processing apparatus of FIG. 1. The front view is obtained by projecting the laser processing apparatus 10 onto an xz plane.

Figure 3:
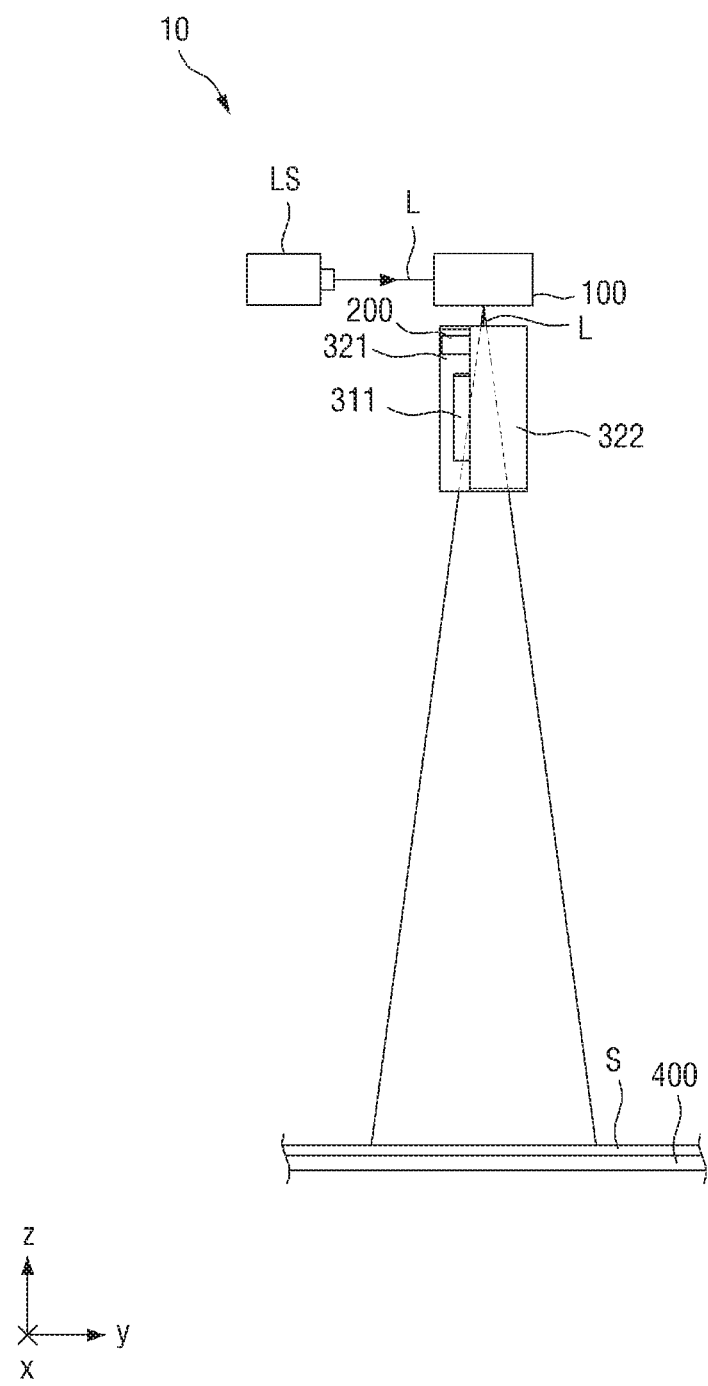
FIG. 3 is a side view of an exemplary embodiment of the laser processing apparatus of FIG. 1.

FIG. 3 is a side view of to an exemplary embodiment of the laser processing apparatus of FIG. 1. The side view is obtained by projecting the laser processing apparatus 10 onto a yz plane.

Referring to FIGS. 1 to 3, an exemplary embodiment of the laser processing apparatus may be used for processing a substrate S or the like using a laser. In one exemplary embodiment, for example, the laser processing apparatus 10 may be used to cut the substrate S, to heat the substrate S or an element on the substrate S, or to perform patterning.

In an exemplary embodiment, the laser processing apparatus 10 may include a laser source LS that irradiates a laser beam L, a scanner unit 100 that controls the traveling direction of the laser beam L, an F-theta lens 200 that adjusts the focus of the laser beam L passed through the scanner unit 100, a reflector unit 300 that reflects the laser beam L passed through the F-theta lens 200 to expand a scanning line area, and a stage 400 on which the substrate S is disposed.

For convenience of description, an xyz coordinate system is defined as shown in FIG. 1.

In an exemplary embodiment, as shown in FIG. 1, a substrate S to be subjected to laser processing is disposed or placed on the stage 400. The surface of the stage 400 on which the substrate S is disposed may be parallel to the xy plane. The stage 400 may move along directions orthogonal to each other on the xy plane. In one exemplary embodiment, for example, the stage 400 may move along x-axis and y-axis that are orthogonal to each other.

The laser source LS, the scanner unit 100, the F-theta lens 200 and the reflector unit 300 are disposed above the stage 400 (e.g., spaced apart from the stage 400 in the z-axis direction). In one exemplary embodiment, for example, the reflector unit 300 may be disposed above the stage 400, the F-theta lens 200 may be disposed above the reflector unit 300, and the scanner unit 100 may be disposed above the F-theta lens 200. The laser source LS may be positioned at a same height as the scanner unit 100 with respect to a surface of the stage 400, for example.

The laser source LS irradiates the laser beam L. The laser source LS may irradiate the laser beam L continuously or discretely. The wavelength, amplitude, energy density, etc. of the laser beam L may be adjusted by a scanner unit (not shown) of the laser source LS.

The laser source LS may irradiate a single beam or multi-beams. In an exemplary embodiment, the laser source LS irradiates a single beam.

The laser beam L travels straight to reach the scanner unit 100. The scanner unit 100 changes the traveling direction of the laser beam L incident thereto toward the reflector unit 300. The output angle of the laser beam L may be controlled by the scanner unit 100. In an exemplary embodiment, the scanner unit 100 includes one or more galvano mirrors (or galvanometer mirrors) 111 and 112 (shown in FIG. 4) to control the output angle of the laser beam L. The galvano mirrors 111 and 112 are arranged to be inclined with respect to the incident direction of the laser beam L. The inclination angles (or the slope) of the galvano mirrors 111 and 112 may be controlled by a galvanometer (not shown). As the inclination angles of the galvano mirrors 111 and 112 vary, the incidence angles of the laser beams L on the galvano mirrors 111 and 112 also vary, and reflection angles thereby vary.

The galvano mirrors 111 and 112 may include a first galvano mirror 111 that controls the output angle by changing the reflection angle in a first direction (e.g., the y-direction), and a second galvano mirror 112 that controls the output angle by changing the reflection angle in a second direction (e.g., the x-direction).

Figure 4:
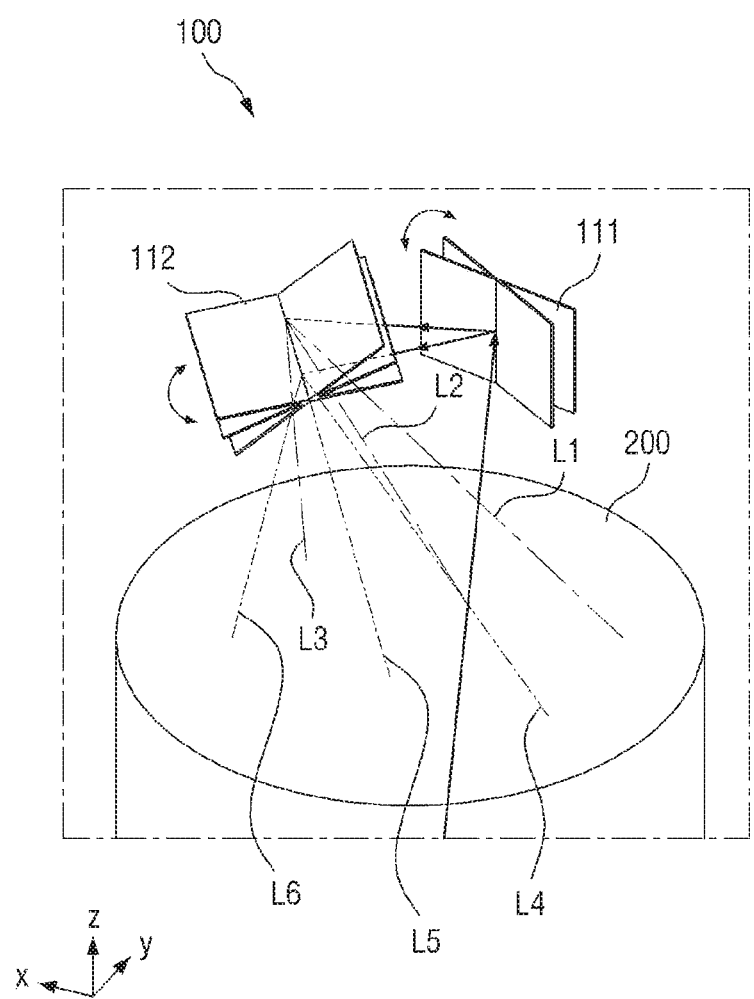
FIG. 4 is a perspective view illustrating a path of a laser beam reflected by a first galvano mirror and a second galvano mirror according to an exemplary embodiment of the disclosure.

FIG. 4 is a perspective view illustrating a path of a laser beam reflected by a first galvano mirror and a second galvano mirror according to an exemplary embodiment of the disclosure.

Figure 5:
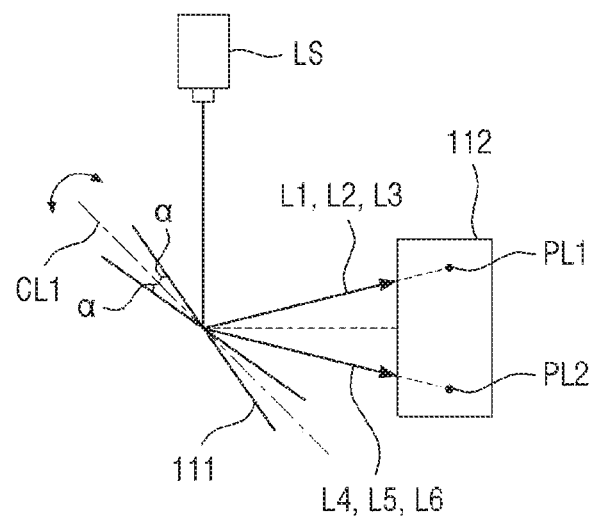
FIG. 5 is a plan view illustrating a path of a laser beam depending on the inclination angle of a first galvano mirror according to an exemplary embodiment of the disclosure.
Figure 5:
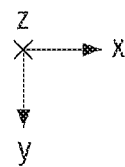

FIG. 5 is a plan view illustrating a path of a laser beam depending on the inclination angle of a first galvano mirror according to an exemplary embodiment of the disclosure.

Figure 6:
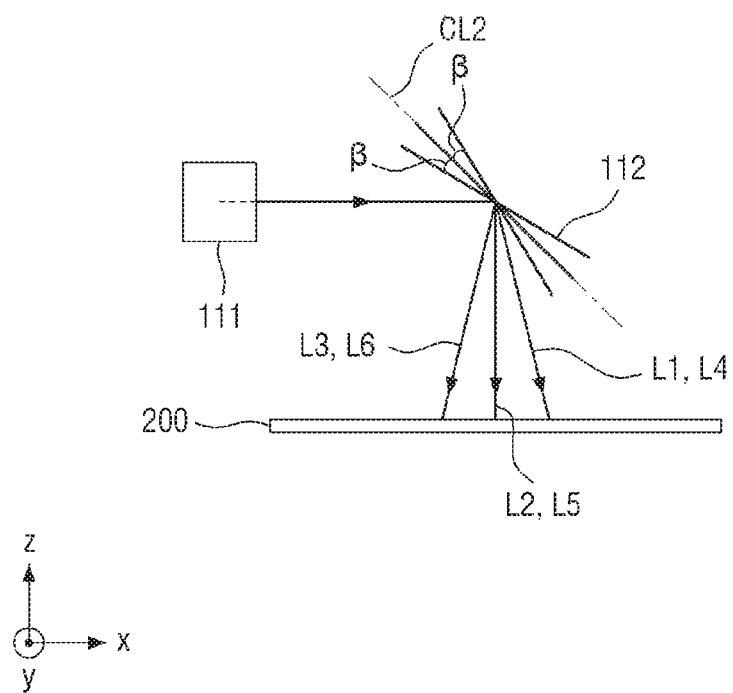
FIG. 6 is a front view illustrating a traveling path of a laser beam depending on the inclination angle of a second galvano mirror according to an exemplary embodiment of the disclosure.

FIG. 6 is a front view illustrating a traveling path of a laser beam depending on the inclination angle of a second galvano mirror according to an exemplary embodiment of the disclosure.

Figure 7:
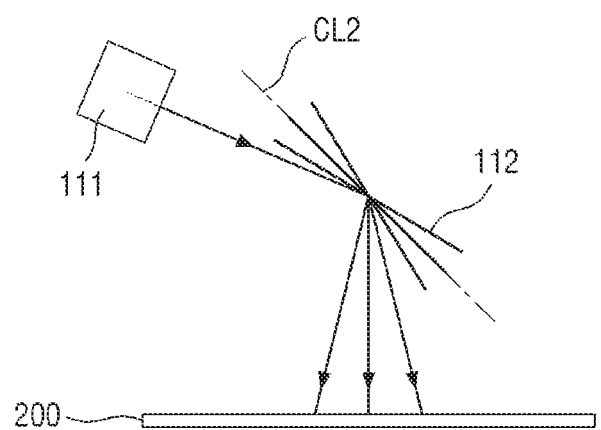
FIG. 7 is a front view illustrating a traveling path of a laser beam depending on the inclination angle of a second galvano mirror according to an alternative exemplary embodiment of the disclosure.

FIG. 7 is a front view illustrating a traveling path of a laser beam depending on the inclination angle of a second galvano mirror according to an alternative exemplary embodiment of the disclosure.

Referring to FIGS. 4 to 6, in an exemplary embodiment, the first galvano mirror 111 adjusts the path of the laser beam L in the first direction by adjusting the inclination angle on the xy plane. In an exemplary embodiment, the first direction may be the y-axis direction.

The second galvano mirror 112 adjusts the path of the laser beam L in the second direction by adjusting the inclination angle on the xz plane. The second direction refers to a direction which is not parallel to the first direction. In an exemplary embodiment, the second direction may be the x-axis direction.

In an exemplary embodiment, the first galvano mirror 111 and the second galvano mirror 112 may be positioned at a same height as the laser source LS with respect to the surface of the stage 400, but not being limited thereto. In an alternative exemplary embodiment, the second galvano mirror 112 may be positioned between the first galvano mirror 111 and the stage 400 as shown in FIG. 7.

The first galvano mirror 111 may be disposed on the path of the laser beam L that is emitted from the laser source LS and travels straight.

The second galvano mirror 112 may be disposed on the path of the laser beam L that is reflected by the first galvano mirror 111.

Hereinafter, the traveling path of the laser beam depending on the inclination angle of the first galvano mirror 111 will be described in detail with reference to FIG. 5.

In an exemplary embodiment, the reflecting surface of the first galvano mirror 111 may be disposed in a way such that the reflecting surface of the first galvano mirror 111 faces the laser source LS. The laser beam L emitted from the laser source LS may be incident on the reflecting surface of the first galvano mirror 111. The laser beam L traveling straight in a predetermined direction is reflected by the first galvano mirror 111 in a way such that the reflected laser beam L travels in a different direction that is not parallel to the predetermined direction. In one exemplary embodiment, for example, when the laser beam L travels in the first direction (y-axis direction) as shown in FIG. 5, the laser beam L reflected by the first galvano mirror 111 travels in a direction close to the second direction (x-axis direction) to reach the second galvano mirror 112.

The first galvano mirror 111 may rotate to have a plurality of discrete inclinations (rotation angles) on the xy plane. In one exemplary embodiment, for example, the first galvano mirror 111 may rotate to have a first inclination and a second inclination different from the first inclination on the xy plane. When an imaginary straight line having an average inclination of the first inclination and the second inclination is defined as a first criterion line CL1, the first inclination has the angle of $\alpha$ measured counterclockwise with respect to the first criterion line CL1, while the second inclination has the angle of $\alpha$ measured clockwise with respect to the first criterion line CL1. Accordingly, the angle between the first inclination and the second inclination becomes $2\alpha$.

The incidence angle of the laser beam L incident on the first galvano mirror 111 varies depending on the inclination of the first galvano mirror 111. In one exemplary embodiment, for example, the laser beam L may have the incidence angle of 45° with respect to the first criterion line CL1. In such an embodiment, the incidence angle is 45°+$\alpha$ when the first galvano mirror 111 has the first inclination, and the incidence angle is 45°−$\alpha$ when the first galvano mirror 111 has the second inclination.

According to the law of reflection, the laser beam L has the reflection angle of 45°+$\alpha$ when the first galvano mirror 111 has the first inclination, and the laser beam L has the reflection angle of 45°−$\alpha$ when the first galvano mirror 111 has the second inclination.

A point at which the laser beam L reflected by the first galvano mirror 111 having the first inclination meets the second galvano mirror 112 is referred to as PL1, and a point at which the laser beam L reflected by the first galvano mirror 111 having the second inclination meets the second galvano mirror 112 is referred to as PL2. The points PL1 and PL2 are spaced apart from each other in the first direction (y-axis direction) on the xy plane.

Since the incidence angle and the reflection angle of the laser beam L vary depending on the inclination of the first galvano mirror 111, even when the laser beam L is incident on the same point of the first galvano mirror 111, the laser beam L may be incident on different points of the second galvano mirror 112.

Hereinafter, the traveling path of the laser beam depending on the inclination angle of the second galvano mirror 112 will be described in detail with reference to FIG. 6.

In an exemplary embodiment, the reflecting surface of the second galvano mirror 112 may be disposed in a way such that the reflecting surface of the second galvano mirror 112 faces the first galvano mirror 111. The laser beam L reflected by the first galvano mirror 111 is incident on the reflecting surface of the second galvano mirror 112. The laser beam L traveling straight in a direction may be reflected by the second galvano mirror 112 toward the F-theta lens 200. FIG. 6 illustrates an exemplary embodiment where the laser beam L traveling straight in the second direction (x-axis direction) is reflected toward the F-theta lens 200.

The second galvano mirror may rotate to have a plurality of continuous inclinations (rotation angles) on the xy plane. The second galvano mirror 112 may rotate continuously between a third inclination and a fourth inclination different from the third inclination on the xz plane. When an imaginary straight line having an average inclination of the third inclination and the fourth inclination is defined as a second criterion line CL2, the third inclination has the angle of $\beta$ measured counterclockwise with respect to the second criterion line CL2, and the fourth inclination has the angle of $\beta$ measured clockwise with respect to the second criterion line CL2. Accordingly, the angle between the third inclination and the fourth inclination becomes $2\beta$.

The incidence angle of the laser beam L incident on the second galvano mirror 112 varies depending on the inclination of the second galvano mirror 112. In one exemplary embodiment, for example, the laser beam L may have the incidence angle of 45° with respect to the second criterion line CL2. In such an embodiment, the incidence angle is 45°+$\beta$ when the second galvano mirror 112 has the third inclination, while the incidence angle is 45°−$\beta$ when the second galvano mirror 112 has the fourth inclination.

The reflection angle varies depending on the inclination of the second galvano mirror 112. According to the law of reflection, when the incidence angle changes, the reflection angle changes as much as the incidence angle.

Figure 8:
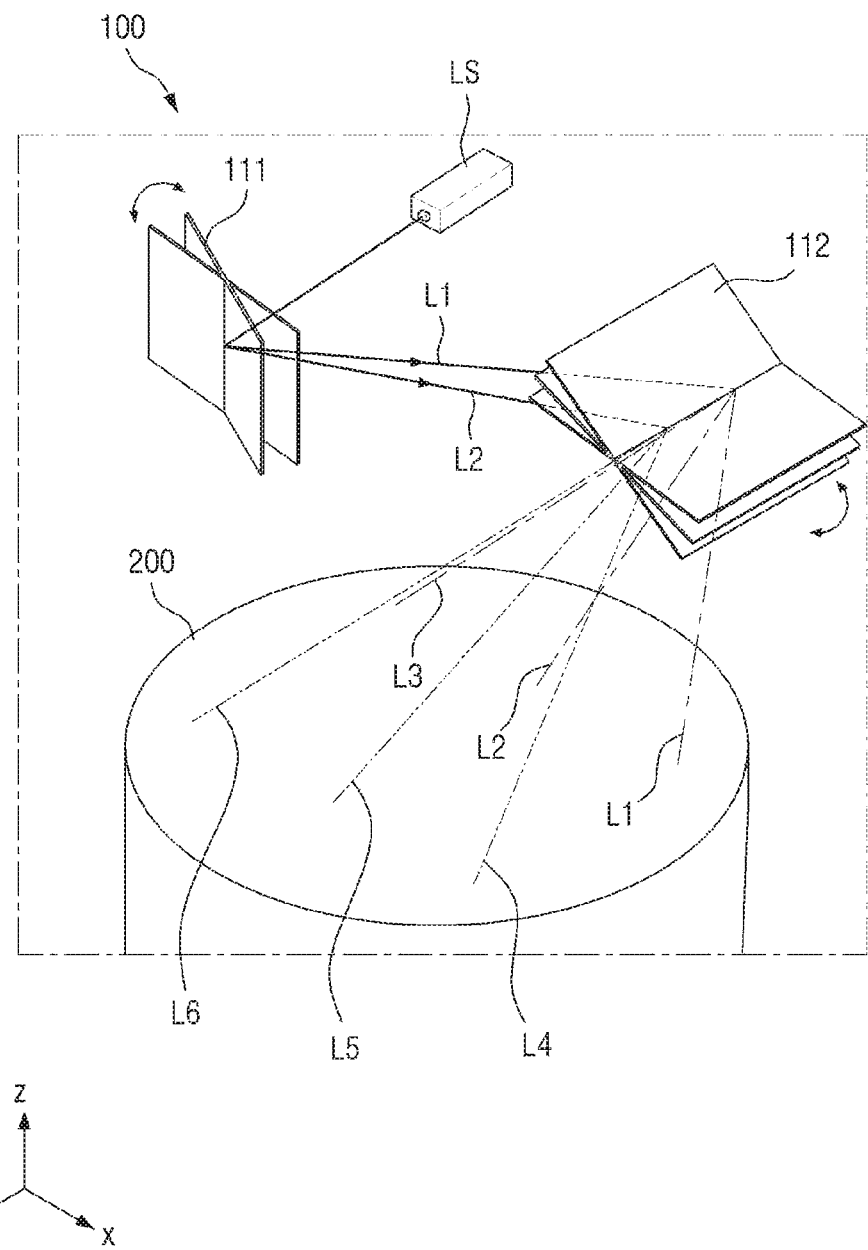
FIG. 8 is a perspective view illustrating a path of a laser beam reflected by a first galvano mirror and a second galvano mirror according to an exemplary embodiment of the disclosure.

FIG. 8 is a perspective view illustrating a path of a laser beam reflected by a first galvano mirror and a second galvano mirror according to an exemplary embodiment of the disclosure.

Referring to FIGS. 1, 5, 6 and 8, in an exemplary embodiment, the laser beam L reflected by the second galvano mirror 112 passes through the F-theta lens 200. The F-theta lens 200 may be disposed between the scanner unit 100 and the stage 400. The F-theta lens 200 adjusts the focal distance of the laser beam L to be constant, thereby focusing the laser beam L onto an area of the substrate S that is to be processed.

The laser beam L having passed through the F-theta lens 200 may reach the substrate S via the reflector unit 300.

The reflector unit 300 may expand a scanning line area. The scanning line area refers to a portion of the substrate S that can be processed with the laser beam L.

The reflector unit 300 includes one or more sub-reflector units. The reflector unit 300 is disposed between the F-theta lens 200 and the stage 400 such that the reflector unit 300 has a predetermined inclination. The area of the stage 400 where the laser beam L can reach varies depending on the inclination angle of the reflector unit 300.

The reflector unit 300 may be fixed to, but is not limited to, the scanner unit 100 or the F-theta lens 200 by mounting brackets or a thread adapter.

Referring back to FIG. 1, the reflector unit 300 may include a first sub-reflector unit 310 that directly reflects the laser beam L traveling through the F-theta lens 200, and a second sub-reflector unit 320 that changes the path of the laser beam L reflected off the first sub-reflector unit 310 toward the stage 400.

The sub-reflector units 310 and 320 are implemented as objects capable of reflecting the laser beam L. In one exemplary embodiment, for example, a mirror having a large refractive index may be used.

The sub-reflector units 310 and 320 may include at least one mirror. In an exemplary embodiment, as shown in FIG. 1, the first sub-reflector unit 310 may include a first mirror 311 and a second mirror 312, and the second sub-reflector unit 320 may include a third mirror 321 and a fourth mirror 322

The first mirror 311 and the second mirror 312 may be located at a same height with respect to a surface of the stage 400. The first mirror 311 and the second mirror 312 may be spaced apart from each other in the first direction (y-axis direction) and may intersect each other on the xz plane. In such an embodiment, the first mirror 311 and the second mirror 312 may have inclinations of opposite signs with respect to the surface of the stage 400, respectively.

The first mirror 311 and the second mirror 312 may be inclined with respect to the incident direction of the laser beam L. In an exemplary embodiment, the first mirror 311 and the second mirror 312 may be disposed with predetermined inclinations with respect to the xy plane. Each of the first mirror 311 and the second mirror 312 may be disposed with a constant inclination. In such an embodiment, the first mirror 311 and the second mirror 312 do not rotate on the xy plane but are fixed with constant inclinations.

The third mirror 321 may be disposed parallel to the first mirror 311, spaced apart from the first mirror 311 with a predetermined distance. The fourth mirror 322 may be disposed parallel to the second mirror 312, spaced apart from the second mirror 312 with a predetermined distance. The third mirror 321 and the fourth mirror 322 may be fixed to have constant inclinations with respect to the xy plane. In such an embodiment, the third mirror 321 and the fourth mirror 322 do not rotate but are fixed with constant inclinations.

The width of the reflecting surfaces of the third mirror 321 and the fourth mirror 322 may be greater than the width of the reflecting surfaces of the first mirror 311 and the reflecting surface of the second mirror 312, respectively.

Hereinafter, the optical path of the laser beam L according to the inclinations of the first galvano mirror 111 and the second galvano mirror 112 will be described in detail with reference to FIG. 8. For convenience of description, in a case where the reflector unit 300 is omitted will be described first.

First, the optical path of the first laser beam L1 when the first galvano mirror 111 has a first inclination and the second galvano mirror 112 has a third inclination will be described.

The first laser beam L1 is incident on and reflected by the first galvano mirror 111 having the first inclination and then is incident on the second galvano mirror 112. In FIG. 5, a point at which the first laser beam L1 is incident on the second galvano mirror 112 is denoted by PL1.

The first laser beam L1 incident on the second galvano mirror 112 having the third inclination is reflected by the second galvano mirror 112 at the reflection angle equal to the incidence angle according to the law of reflection. The first laser beam L1 reflected by the second galvano mirror 112 passes through the F-theta lens 200 to reach the substrate S. In an exemplary embodiment, as shown in FIG. 1, the first laser beam L1 passed through the F-theta lens 200 reaches a point P1 on an imaginary straight line on the substrate S. The imaginary straight line may be parallel to the second direction (x-axis direction).

Subsequently, the optical path of the second laser beam L2 when the first galvano mirror 111 has the first inclination and the second galvano mirror 112 has the same inclination as the second criterion line CL2 will be described.

When the first galvano mirror 111 has the first inclination and the second galvano mirror 112 has the same inclination as the second criterion line CL2, the second laser beam L2 is incident on and reflected by the first galvano mirror 111 and reaches the point PL1 of the second galvano mirror 112, as shown in FIG. 5. The second laser beam L2 incident on the second galvano mirror 112 is reflected at the angle equal to the incidence angle according to the law of reflection. As the second galvano mirror 112 has the same inclination as the second criterion line CL2, the direction of the reflected second laser beam L2 is different from the direction of the reflected first laser beam L1 when the second galvano mirror 112 has the third inclination. The second laser beam L2 reflected from the second galvano mirror 112 passes through the F-theta lens 200 and reaches a point P2 on the imaginary straight line on the substrate S as shown in FIG. 1. The point P2 is spaced apart from the point P1 in the second direction (x-axis direction).

Next, the optical path of the third laser beam L3 when the first galvano mirror 111 has the first inclination and the second galvano mirror 112 has a fourth inclination will be described.

When the first galvano mirror 111 has the first inclination and the second galvano mirror 112 has the fourth inclination, the third laser beam L3 is incident on and reflected by the first galvano mirror 111 and reaches the point PL1 of the second galvano mirror 112, as shown in FIG. 5. The third laser beam L3 incident on the second galvano mirror 112 is reflected at the angle equal to the incidence angle according to the law of reflection. As the second galvano mirror 112 has the fourth inclination, the direction of the reflected third laser beam L3 is different from those of the reflected first laser beam L1 and the reflected second laser beam L2. The third laser beam L3 reflected from the second galvano mirror 112 passes through the F-theta lens 200 and reaches a point P3 on the imaginary straight line on the substrate S. The point P3 is spaced apart from the point P1 in the second direction (x-axis direction).

The positions on the substrate S where the first to third laser beams L1 to L 3 reach vary depending on the degree of rotation of the second galvano mirror 112. The second galvano mirror 112 can rotate continuously and accordingly the laser beam L may reach the substrate S through substantially all of the paths between the first laser beam L1 and the third laser beam L3. That is, the laser beam L meets the substrate in all areas included in an imaginary straight line connecting the points P1 with P3. A portion of the imaginary straight line connecting the points P1 with P3 defines the first sub-scanning line SSL1.

Next, the optical path of the fourth laser beam L4 when the first galvano mirror 111 has the second inclination and the second galvano mirror 112 has the third inclination will be described.

The fourth laser beam L4 is incident on and reflected by the first galvano mirror 111 having the second inclination and then is incident on the second galvano mirror 112. In FIG. 5, a point on which the fourth laser beam L4 is incident is denoted by PL2.

The fourth laser beam L4 incident on the second galvano mirror 112 having the third inclination is reflected by the second galvano mirror 112 at the reflection angle equal to the incidence angle according to the law of reflection. The fourth laser beam L4 reflected by the second galvano mirror 112 passes through the F-theta lens 200 to reach the substrate S. Specifically, the laser beam L4 reaches a point P4 on an imaginary straight line on the substrate S. The imaginary straight line may be parallel to the second direction (x-axis direction).

Subsequently, the optical path of the fifth laser beam L5 when the first galvano mirror 111 has the second inclination and the second galvano mirror 112 has the same inclination as the second criterion line CL2 will be described.

When the first galvano mirror 111 has the second inclination and the second galvano mirror 112 has the same inclination as the second criterion line CL2, the fifth laser beam L5 is incident on and reflected by the first galvano mirror 111 and reaches the point PL2 of the second galvano mirror 112. The fifth laser beam L5 incident on the second galvano mirror 112 is reflected at the angle equal to the incidence angle according to the law of reflection. As the second galvano mirror 112 has the same inclination as the second criterion line CL2, the direction of the reflected fifth laser beam L5 is different from that of the reflected fourth laser beam L4. The fifth laser beam L5 reflected from the second galvano mirror 112 passes through the F-theta lens 200 and reaches a point P5 on the imaginary straight line on the substrate S. The point P5 is spaced apart from the point P4 in the second direction (x-axis direction).

Next, the optical path of the sixth laser beam L6 when the first galvano mirror 111 has the second inclination and the second galvano mirror 112 has the fourth inclination will be described.

When the first galvano mirror 111 has the second inclination and the second galvano mirror 112 has the fourth inclination, the sixth laser beam L6 is incident on and reflected by the first galvano mirror 111, and reaches the point PL2 of the second galvano mirror 112. The sixth laser beam L6 incident on the second galvano mirror 112 is reflected at the angle equal to the incidence angle according to the law of reflection. As the second galvano mirror 112 has the fourth inclination, the direction of the reflected sixth laser beam L6 is different from that of the fourth laser beam L4 and the fifth laser beam L5. The sixth laser beam L6 reflected from the second galvano mirror 112 passes through the F-theta lens 200 and reaches a point P6 on the line SSL2 on the substrate S. The point P6 is further spaced apart from the point P4 in the second direction (x-axis direction).

Since the second galvano mirror 112 can rotate continuously, when the first galvano mirror 111 has the second inclination, the laser beam L can travel along all of the paths between the fourth laser beam L4 and the sixth laser beam L6. In other words, the laser beam L can reach all the areas included in the line connecting the points P4 with P6. The portion of the imaginary straight line connecting the points P4 with P6 defines the second sub-scanning line SSL2.

The lengths of the first sub-scanning line SSL1 and the second sub-scanning line SSL2 are determined by the rotation angle 213 of the second galvano mirror 112.

The first sub-scanning line SSL1 and the second sub-scanning line SSL2 are spaced apart from each other in the first direction (y-axis direction). The spacing distance is proportional to the angle $2\alpha$ between the first inclination and the second inclination of the first galvano mirror 111.

Subsequently, the optical path of the laser beam L passing through the scanner unit 100, the F-theta lens 200 and the reflector unit 300 according to an exemplary embodiment will be described in detail.

In an exemplary embodiment, since the laser processing apparatus 10 further includes the reflector unit 300 under the F-theta lens 200 as described above, the laser beam L passed through the F-theta lens 200 further passes through the reflector unit 300 before the laser beam L reaches the substrate S.

Hereinafter, the optical paths of the first, second and third laser beams L1, L2 and L3 passed through the first galvano mirror 111 having the first inclination will be described first.

Figure 9:
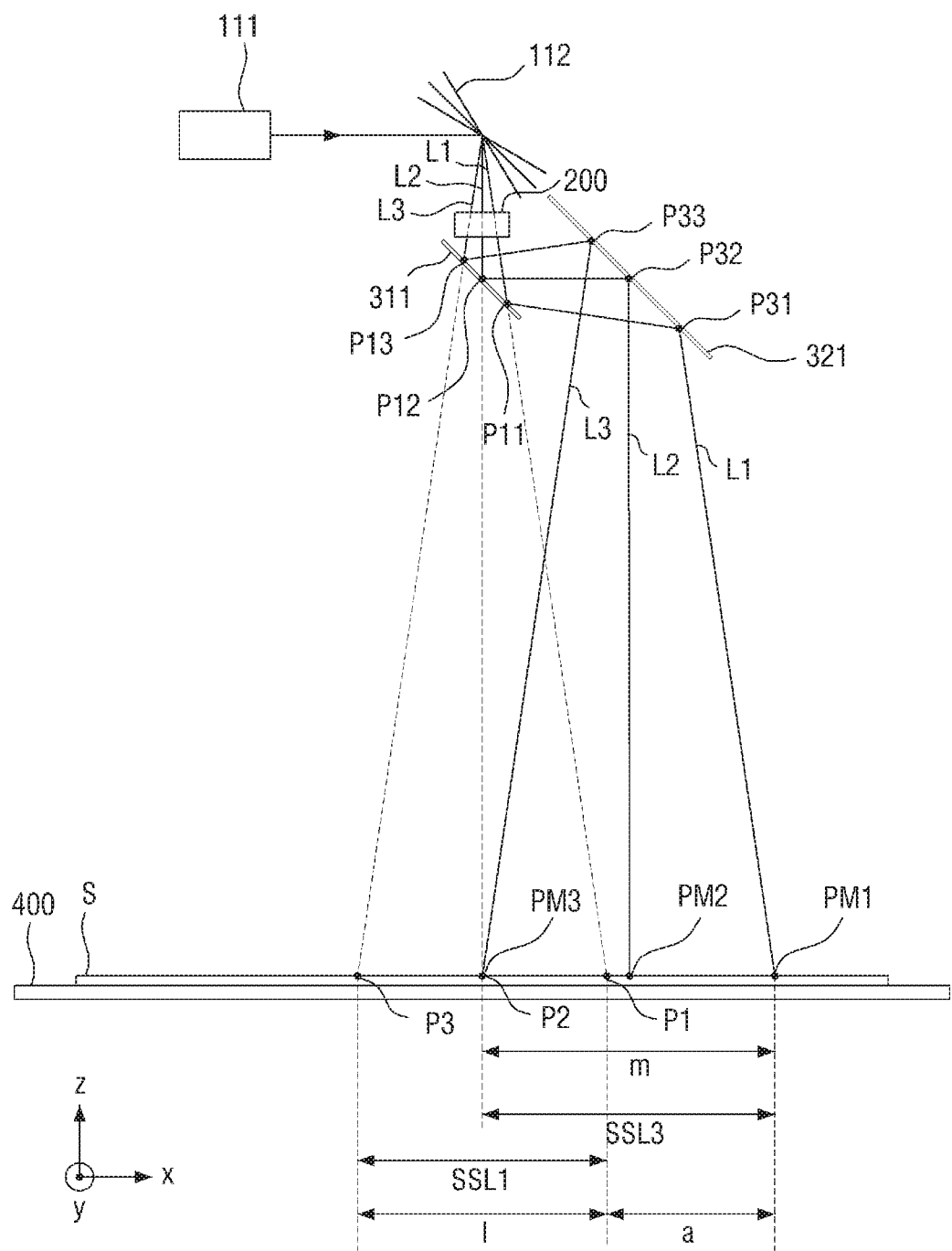
FIG. 9 is a front view showing a path of a laser beam passing through a scanner unit including a first galvano mirror having a first inclination and a reflector unit according to an exemplary embodiment of the disclosure.

FIG. 9 is a front view showing a path of a laser beam passing through a scanner unit including a first galvano mirror having a first inclination and a reflector unit according to an exemplary embodiment of the disclosure.

First, the optical path of the first laser beam L1 incident on the first mirror 311 at a first angle will be described.

The first laser beam L1 having passed through the F-theta lens 200 is incident on the first mirror 311 at the first angle. In FIG. 9, a point of the first mirror 311 where the first laser beam L1 reaches is referred to as the point P11. The first laser beam L1 reflected at the first angle reaches a point P31 on the third mirror 321 according to the law of reflection. The first laser beam L1 reflected by the third mirror 321 reaches the substrate S. As shown in FIG. 1, the first laser beam L1 reaches a point PM1 on an imaginary straight line on the substrate S. The imaginary straight line may be parallel to the second direction (x-axis direction). The point PM1 is spaced apart from the point P1 toward the positive side in the second direction (x-axis direction). Here, the positive side refers to the direction in which the laser beam L reflected by the first mirror 311 propagates.

Subsequently, the optical path of the second laser beam L2 incident on the first mirror 311 at a second angle will be described.

As shown in FIG. 9, the second laser beam L2 is incident on and reflected by the first mirror 311 and reaches the third mirror 321. In FIG. 9, a point of the first mirror 311 where the second laser beam L2 reaches is referred to as the point P12. The second laser beam L2 is incident on the first mirror 311 at a different angle from the first laser beam L1 as the second galvano mirror 112 rotates. Since the incidence angle (i.e., the first angle) of the first laser beam L1 on the first mirror 311 is different from the incidence angle (i.e., the second angle) of the second laser beam L2, the first laser beam L1 and the second laser beam L2 are reflected at different reflection angles according to the law of reflection, such that they reach different points of the third mirror 321. The second laser beam L2 reflected by the first mirror 311 is further reflected by the third mirror 321 at a point P32 thereof, and then reaches a point PM2 on the imaginary straight line on the substrate S. The point PM2 is spaced apart from the point P2 toward the positive side in the second direction (x-axis direction). The point PM2 is spaced apart from the point PM1 in the second direction (x-axis direction).

Subsequently, the optical path of the third laser beam L3 incident on the first mirror 311 at a third angle will be described.

Similarly to the first laser beam L1, the third laser beam L3 is incident on and reflected by the first mirror 311 and reaches the third mirror 321.

The third laser beam L3 reflected at a point P13 on the first mirror 311 at the third angle reaches a point P33 on the third mirror 321. The third laser beam L3 reflected by the third mirror 321 reaches the substrate S. Specifically, the third laser beam L3 reaches a point PM3 on the imaginary straight line on the substrate S. The point PM3 is spaced apart from the point P3 toward the positive side in the second direction (x-axis direction). The point PM3 is spaced apart from the point PM1 in the second direction (x-axis direction).

In an exemplary embodiment, where the second galvano mirror 112 can rotate continuously, when the first galvano mirror 111 has the first inclination, the laser beam L may travel along all of the paths between the first laser beam L1 and the third laser beam L3. In such an embodiment, the laser beam L can reach all the areas included in an imaginary straight line connecting the points PM1 with PM3. The portion of the imaginary straight line connecting the points PM1 with PM3 defines a third sub-scanning line SSL3.

The third scanning line SSL3 where the laser beam L passed through the scanner unit 100 can reach the substrate S via the reflector unit 300 is shifted toward the positive side in the second direction relative to the first sub-scanning line SSL1 where the laser beam L can directly reach the substrate S.

Next, the optical paths of the fourth, fifth and sixth laser beams L4, L5 and L6 having passed through the first galvano mirror 111 having the second inclination will be described.

Figure 10:
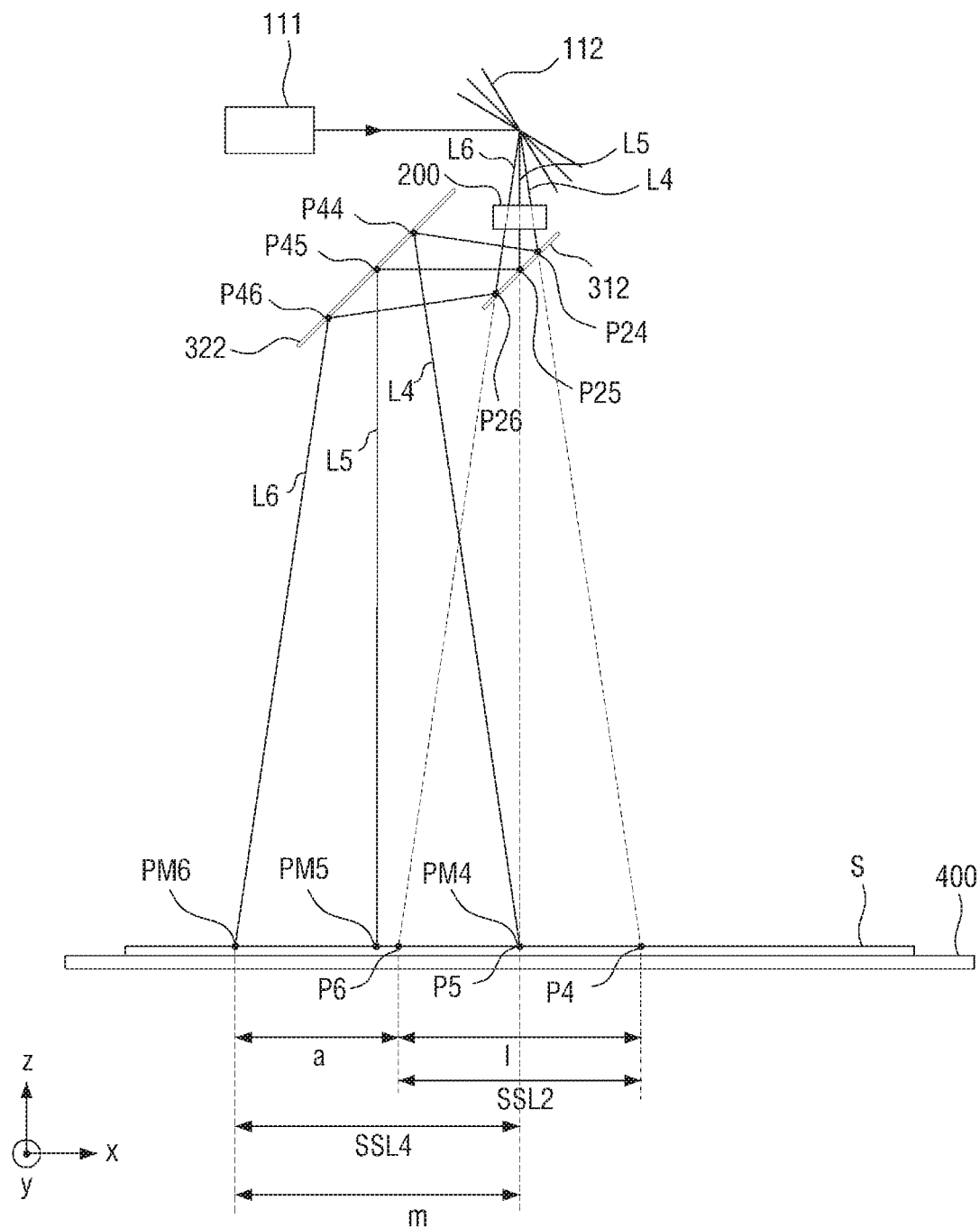
FIG. 10 is a front view showing a path of a laser beam passing through a scanner unit including a first galvano mirror having a second inclination and a reflector unit according to an exemplary embodiment of the disclosure.

FIG. 10 is a front view showing a path of a laser beam passing through a scanner unit including a first galvano mirror having a second inclination and a reflector unit according to an exemplary embodiment of the disclosure.

First, the optical path of the fourth laser beam L4 incident on the second mirror 312 at a fourth angle will be described.

The fourth laser beam L4 having passed through the F-theta lens 200 is incident on the second mirror 312 at the fourth angle. In FIG. 10, a point of the second mirror 312 where the fourth laser beam L4 reaches is referred to as the point P24. The fourth laser beam L4 reflected at the fourth angle reaches a point P44 on the fourth mirror 322 according to the law of reflection. The fourth laser beam L4 reflected by the fourth mirror 322 reaches the substrate S. Specifically, it reaches a point PM4 on a virtual straight line SSL4 on the substrate S. The line SSL4 may be parallel to the second direction (x-axis direction). The point PM4 is spaced apart from the point P4 toward the positive side in the second direction (x-axis direction). Herein, the positive side refers to the direction in which the laser beam L reflected by the second mirror 312 propagates.

Subsequently, the optical path of the fifth laser beam L5 incident on the second mirror 312 at a fifth angle will be described.

Similarly to the fourth laser beam L4, the fifth laser beam L5 is incident on and reflected by the second mirror 312 and reaches the fourth mirror 322. In FIG. 10, a point of the second mirror 312 where the fifth laser beam L5 reaches is referred to as the point P25. The fifth laser beam L5 is incident on the second mirror 312 at a different angle from the fourth laser beam L4 as the second galvano mirror 112 rotates. The fifth laser beam L5 reflected at the fourth angle reaches a point P45 on the fourth mirror 322 according to the law of reflection. Since the incidence angle of the fourth laser beam L4 on the second mirror 312 is different from that of the fifth laser beam L5, the fourth laser beam L4 and the fifth laser beam L5 are reflected at different reflection angles according to the law of reflection, such that the fourth laser beam L4 and the fifth laser beam L5 reach different points of the fourth mirror 322. The fifth laser beam L5 reflected off the second mirror 312 is further reflected by the fourth mirror 322, and then reaches a point PM5 on the line SSL4 on the substrate S. The point PM5 is spaced apart from the point P5 toward the positive side in the second direction (x-axis direction). The point PM5 is spaced apart from the point PM4 in the second direction (x-axis direction).

Subsequently, the optical path of the sixth laser beam L6 incident on the second mirror 312 at a sixth angle will be described.

Similarly to the fourth laser beam L4, the sixth laser beam L6 is incident on and reflected by the second mirror 312 and reaches the fourth mirror 322.

The sixth laser beam L6 reflected from a point P26 on the second mirror 312 at the sixth angle reaches a point P46 on the fourth mirror 322. The sixth laser beam L6 reflected by the fourth mirror 322 reaches the substrate S. Specifically, the sixth laser beam L6 reaches a point PM4 on the imaginary straight line on the substrate S. The point PM6 is spaced apart from the point P6 toward the positive side in the second direction (x-axis direction). The point PM6 is further spaced apart from the point PM4 in the second direction (x-axis direction).

In an exemplary embodiment, where the second galvano mirror 112 can rotate continuously, when the first galvano mirror 111 has the second inclination, the laser beam L can travel along all of the paths between the fourth laser beam L4 and the sixth laser beam L6. In such an embodiment, the laser beam L can reach all the areas included in a portion of the imaginary straight line connecting the points PM4 with PM6. The portion of the imaginary straight line connecting the points PM4 with PM6 defines a fourth sub-scanning line SSL4.

The fourth scanning line SSL4 where the laser beam L passed through the scanner unit 100 can reach the substrate S via the reflector unit 300 is shifted toward the positive side in the second direction (x-axis direction) relative to the second sub-scanning line SSL2 where the laser beam L can directly reach the substrate S.

As shown in FIG. 9, the laser beam L reached the substrate S via the reflector unit 300 may be shifted toward the positive side in the second direction (x-axis direction) relative to the laser beam L in a case where the laser beam L does not pass through the reflecting unit 300.

Referring back to FIGS. 1, 2, 9 and 10, an area where the laser beam L without passing through the reflector unit 300 can reach the substrate S is referred to as a first scanning line SL1. The first scanning line SL1 includes the first sub-scanning line SSL1 and the second sub-scanning line SSL2.

An area where the laser beam L passed through the reflector unit 300 can reach the substrate S is referred to as a second scanning line SL2. The second scanning line SL2 includes the third sub-scanning line SSL3 and the fourth sub-scanning line SSL4.

Referring to FIG. 9, the first sub-scanning line SSL1 has a length 1 in the second direction (x-axis direction). The third sub-scanning line SSL3 has a length m in the second direction (x-axis direction). The third sub-scanning line SSL3 may be shifted by a distance a in the positive side of the second direction (x axis direction) with respect to the first sub-scanning line SSL1.

Referring to FIG. 2, when the first mirror 311 and the second mirror 312 are symmetrical with each other and the third mirror 321 and the fourth mirror 322 are symmetrical with each other, the second scanning line SL2 may be extended by 2a with respect to the first scanning line SL1 on the xy plane. In such an embodiment, the second scanning line SL2 may have a total length of (1+2a).

Figure 11:
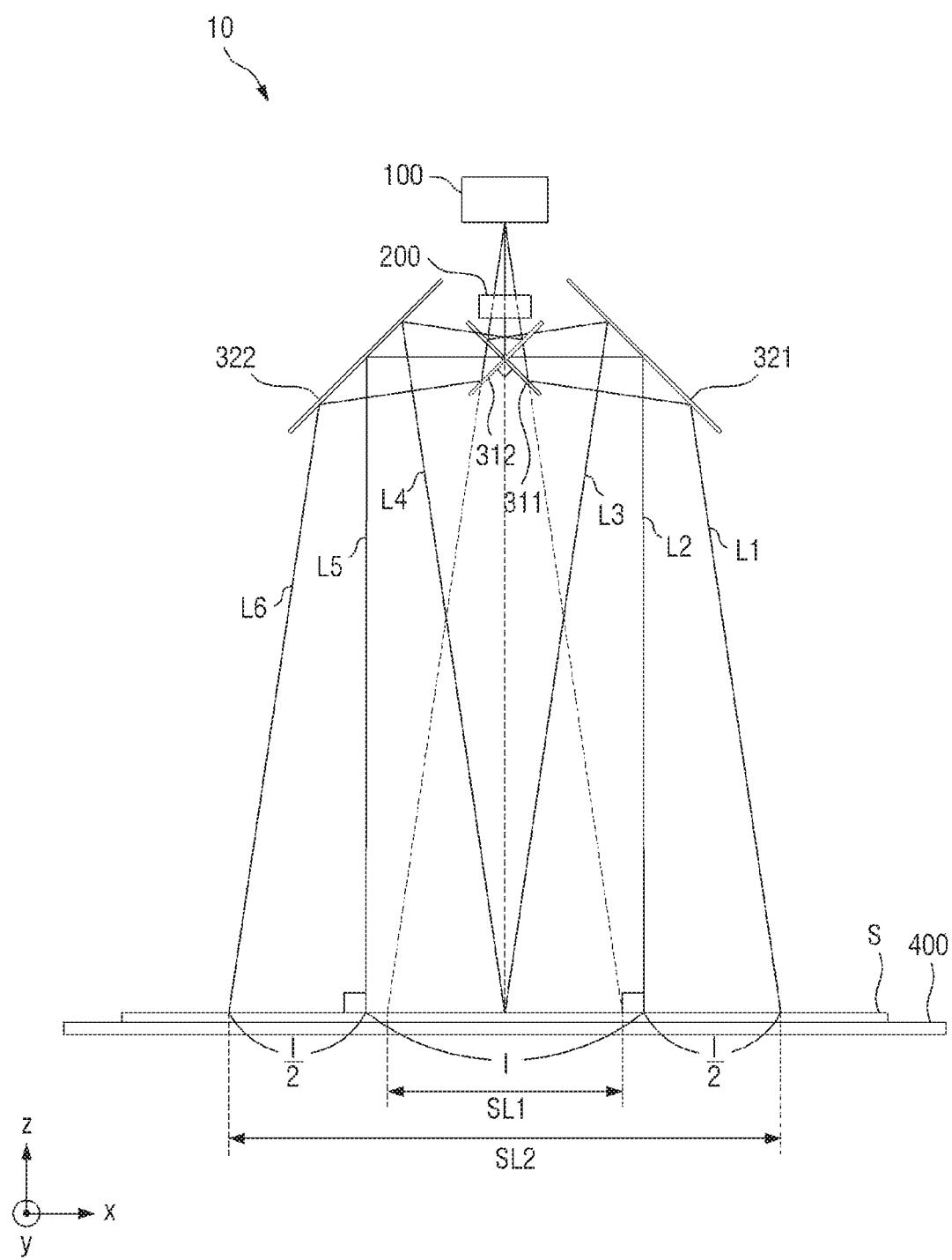
FIG. 11 is a front view of a laser processing apparatus according to an alternative exemplary embodiment of the disclosure.

FIG. 11 is a front view of a laser processing apparatus according to an alternative exemplary embodiment of the disclosure.

The first sub-reflector unit 310 and the second sub-reflector unit 320 may be disposed at the angle of about 45° with respect to the stage 400 on the xz plane. In such an embodiment, the first mirror 311 and the third mirror 321 may be disposed at the angle of about 45° counterclockwise with respect to the stage 400, and the second mirror 312 and the fourth mirror 322 may be disposed at the angle of about 45° clockwise with respect to the stage 400.

The second laser beam L2 may be incident on the first mirror 311 at the angle of about 45°. The second laser beam L2 may be reflected off the third mirror 321 at the angle of about 45° according to the law of reflection. As a result, the second laser beam L2 is incident on the stage 400 at the angle of about 90°.

Similarly to the second laser beam L2, the fifth laser beam L5 is also incident on the stage 400 at the angle of about 90°.

The distance between P2 and PM2 may be $\sqrt{2}s$, when the distance between the first mirror 311 and the third mirror 321 is denoted by s. The distance between P5 and PM5 may be $\sqrt{2}s^1$, when the distance between the second mirror 312 and the fourth mirror 322 is denoted by $s^1$.

In an exemplary embodiment, as shown in FIG. 11, when the distance between the first mirror 311 and the third mirror 321 is equal to the length l of the first scanning line SL1 and the distance between the second mirror 312 and the fourth mirror 322 is also equal to l, the second scanning line SL2 on the xz plane may be 2×l.

The length of the scanning line SL may be determined based on the rotation angle of the second galvano mirror 112, the rotation angle of the first sub-reflector unit 310 and the second sub-reflector unit 320, the distance between the first sub-reflector unit 310 and the second sub-reflector unit 320, the distance between the reflector unit 300 and the substrate S, and the like.

Hereinafter, a change in length of the scanning line SL depending on the distance between the reflector unit 300 and the substrate S will be described with reference to FIGS. 12 to 14.

Figure 12:
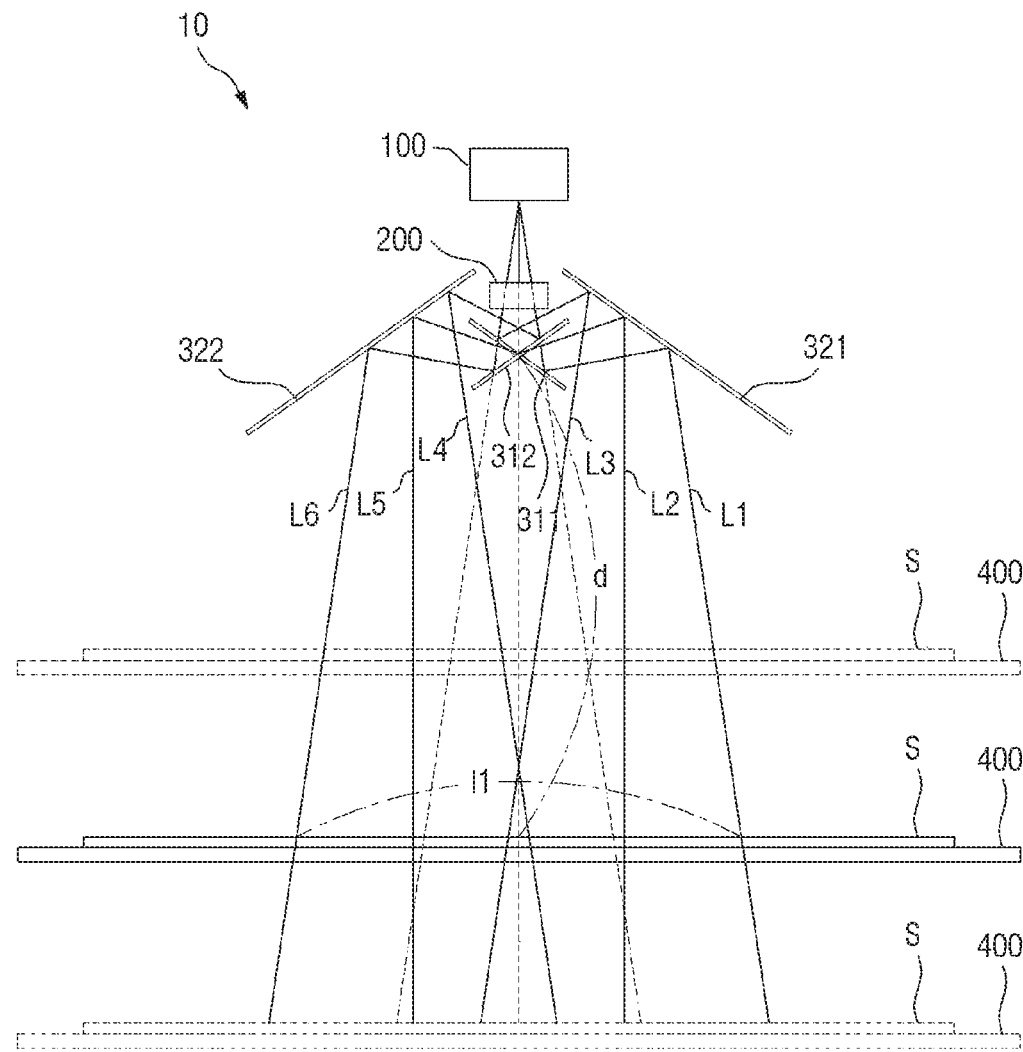
FIG. 12 is a front view of a laser processing apparatus according to another alternative exemplary embodiment of the disclosure.

FIG. 12 is a front view of a laser processing apparatus according to an exemplary embodiment of the disclosure.

Figure 13:
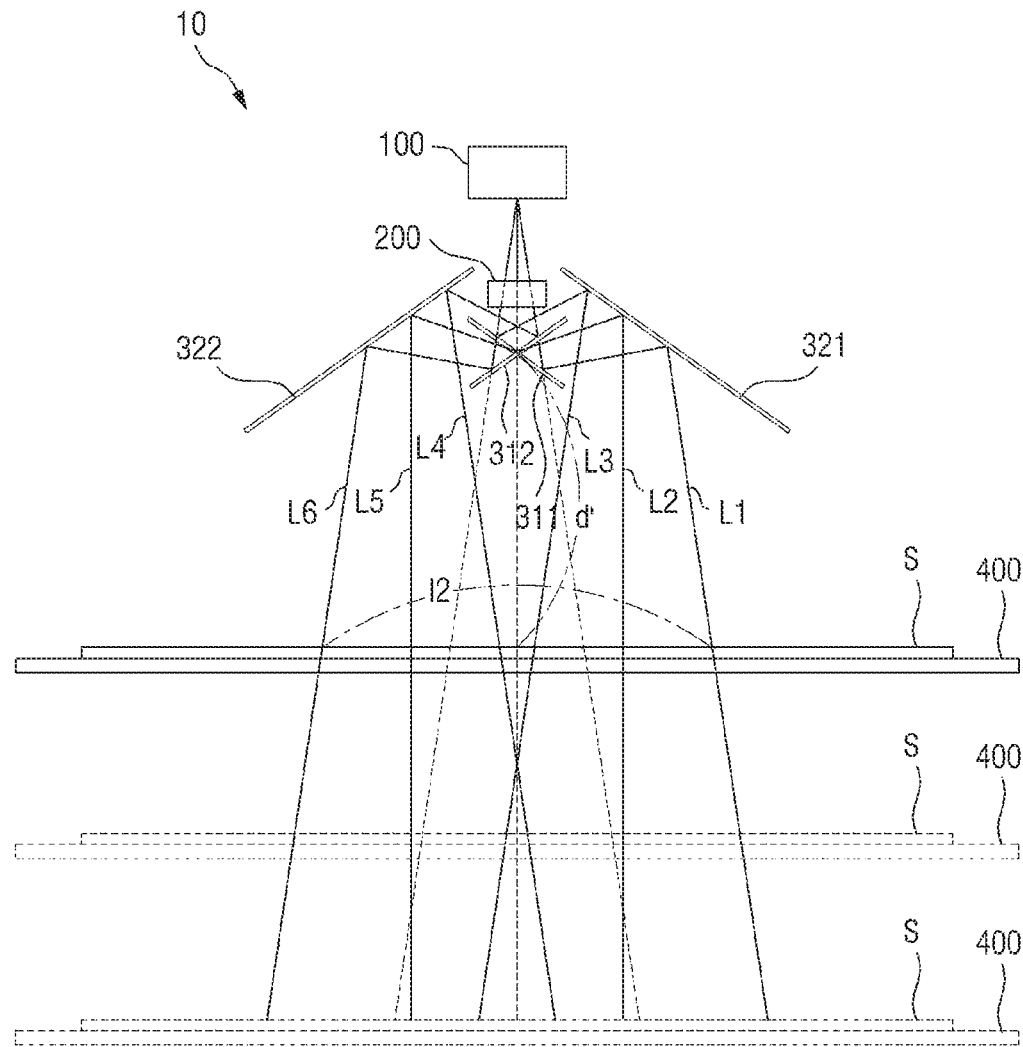
FIG. 13 is a front view of a laser processing apparatus according to yet another alternative exemplary embodiment of the disclosure.

FIG. 13 is a front view of a laser processing apparatus according to an alternative exemplary embodiment of the disclosure.

Figure 14:
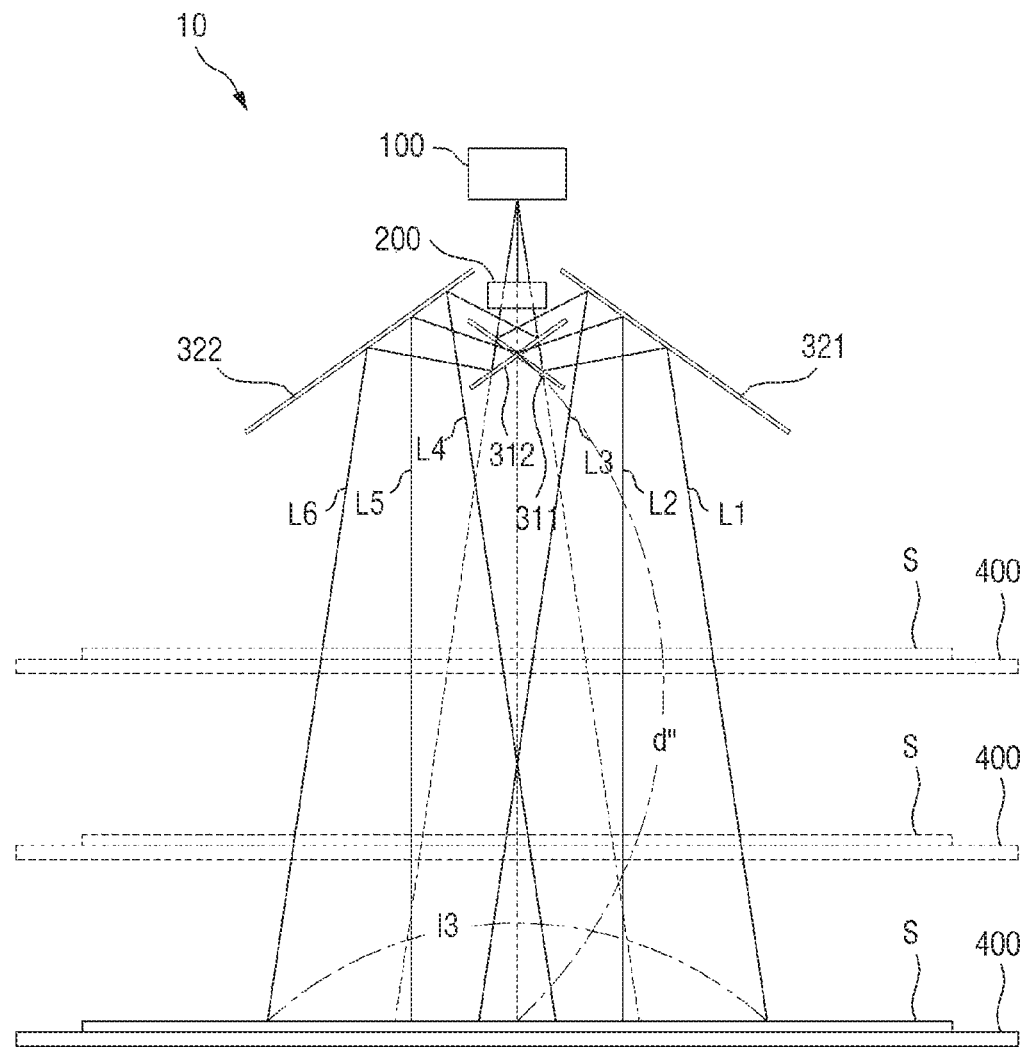
FIG. 14 is a front view of a laser processing apparatus according to yet another alternative exemplary embodiment of the disclosure.

FIG. 14 is a front view of a laser processing apparatus according to yet another alternative exemplary embodiment of the disclosure.

Referring to FIG. 12, the length of the second scanning line SL2 is denoted by l1, where the distance between the reflector unit 300 and the substrate S is denoted by d.

Referring to FIG. 13, the length of the second scanning line SL2 is denoted by l2, where the distance between the reflector unit 300 and the substrate S is denoted by d'. Here, d' is smaller than d.

Referring to FIG. 14, the length of the second scanning line SL2 is denoted by l3, where the distance between the reflector unit 300 and the substrate S is denoted by d". Here, d" is larger than d.

In such embodiments, the value l1 is larger than l2 but is smaller than l3. The length of the scanning line SL may increase with the distance between the reflector unit 300 and the substrate S.

Figure 15:
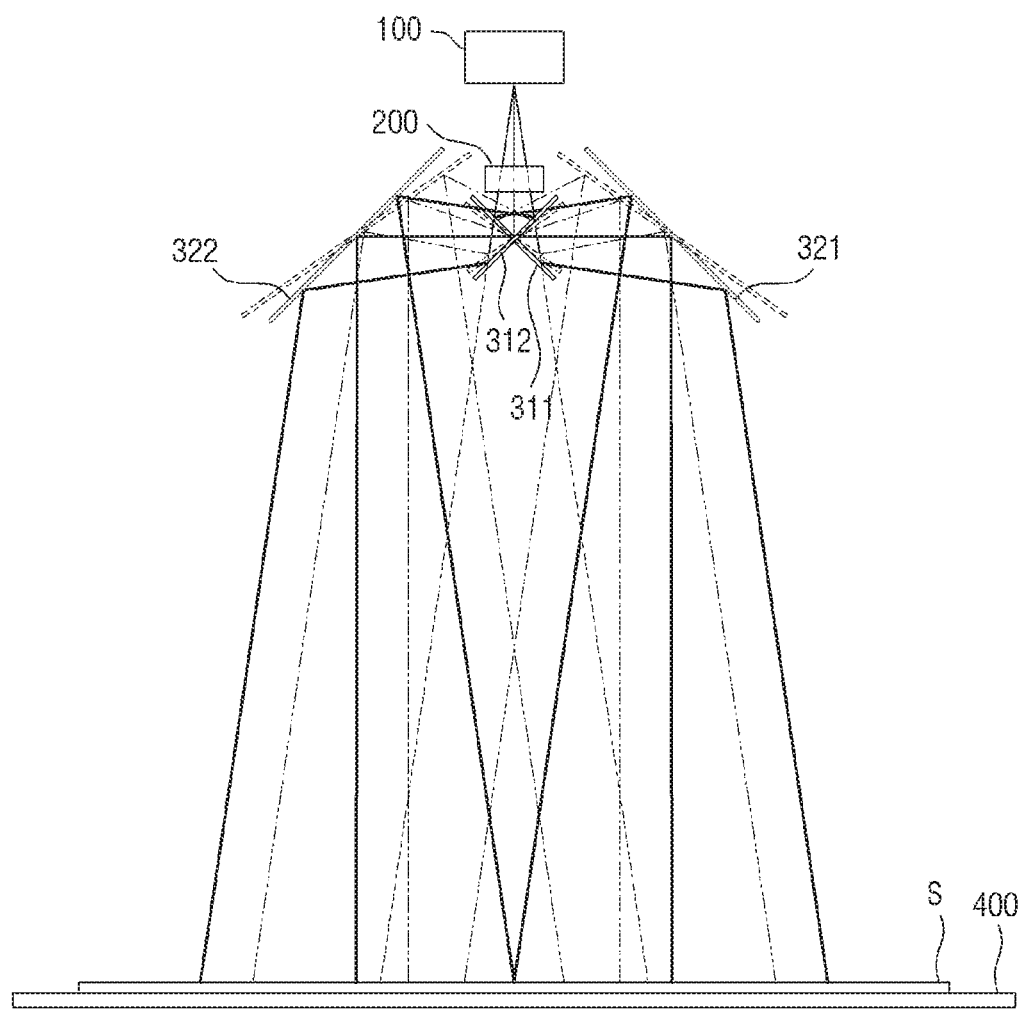
FIG. 15 is a front view of a laser processing apparatus according to exemplary embodiments of the disclosure.

FIG. 15 is a front view of a laser processing apparatus according to exemplary embodiments of the disclosure.

In an exemplary embodiment, when the inclination of the reflector unit 300 varies, the length of the second scanning line SL2 may also vary. Here, the "inclination" of an element may mean the slope of the element with respect to the surface of the substrate 400.

The incidence angle and the reflection angle of the laser beam L with respect to the reflector unit 300 become smaller as the inclination of the reflector unit 300 becomes less on the xz plane. Smaller incidence angle and reflection angle mean that the moving distance of the laser beam L to the positive side in the second direction (x-axis direction) becomes smaller. In such an embodiment, the length of the second scanning line SL2 may be reduced as the inclination of the reflector unit 300 on the xz plane becomes less.

Figure 16:
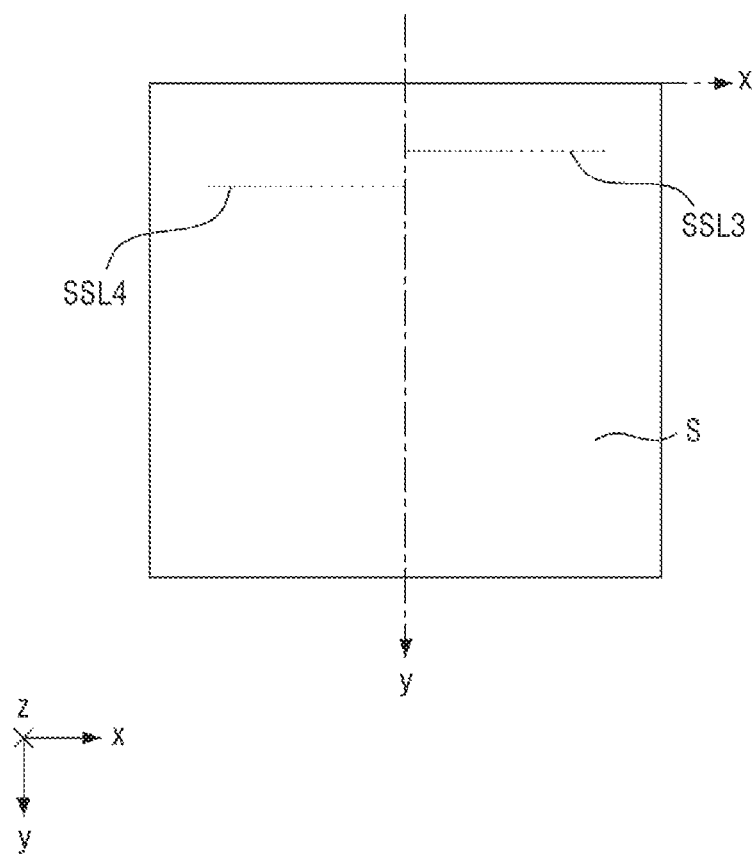
FIG. 16 is a plan view of a substrate processed by a laser processing apparatus according to an exemplary embodiment of the disclosure.

FIG. 16 is a plan view of a substrate processed by a laser processing apparatus according to an exemplary embodiment of the disclosure.

Figure 17:
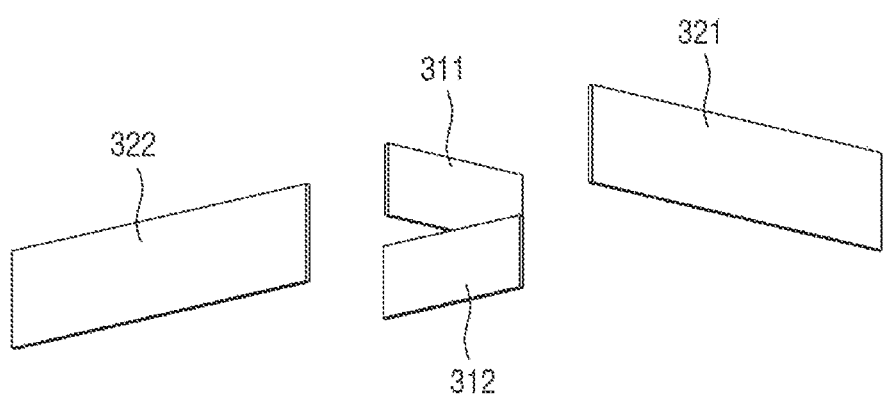
FIG. 17 is a perspective view of a reflector unit according to an exemplary embodiment of the disclosure.
Figure 17:
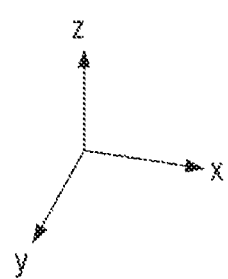

FIG. 17 is a perspective view of a reflector unit according to an exemplary embodiment of the disclosure.

The substrate S may be moved by moving the stage 400. In an exemplary embodiment, the substrate S may move along directions orthogonal to each other on the xy plane. In one exemplary embodiment, for example, the substrate S may move along the x-axis and y-axis that are orthogonal to each other. FIG. 16 illustrates an exemplary embodiment where the substrate S moves in the first direction (y-axis direction).

The substrate S may include a third sub-scanning line SSL3 and a fourth sub-scanning line SSL4. The third sub-scanning line SSL3 and the fourth sub-scanning line SSL4 may meet each other. However, this is merely exemplary. Alternatively, the third sub-scanning line SSL3 and the fourth sub-scanning line SSL4 may overlap with each other or may be spaced apart from each other. The third sub-scanning line SSL3 is an area where the laser beam L can reach the substrate S when the first galvano mirror 111 has the first inclination, and the fourth sub-scanning line SSL4 is an area where the laser beam L can reach the substrate S when the first galvano mirror 111 has the second inclination. In such an embodiment, the third sub-scanning line SSL3 and the fourth sub-scanning line SSL4 may be spaced apart from each other in the first direction (the y axis direction) according to the degree of rotation of the first galvano mirror 111.

FIG. 16 shows an area processed with a laser beam by an exemplary embodiment of the laser processing apparatus 10 when the first mirror 311, the second mirror 312, the third mirror 321 and the fourth mirror 322 have no inclination with respect to the yz plane, where the third sub-scanning line SSL3 and the fourth sub-scanning line SSL4 are spaced apart from each other.

Figure 18:
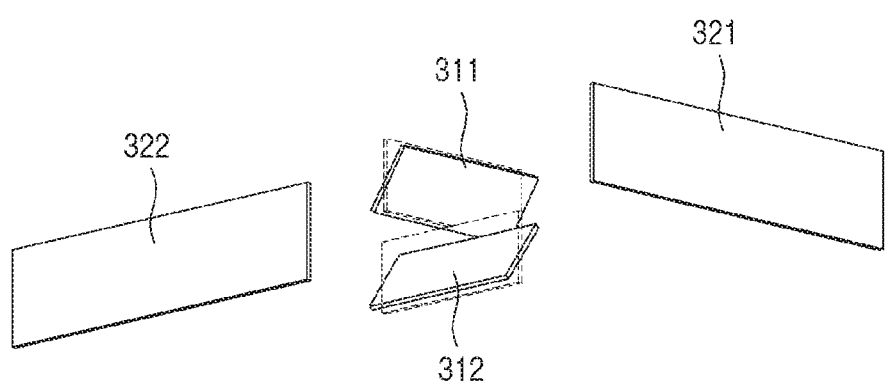
FIG. 18 is a perspective view of a reflector unit according to an alternative exemplary embodiment of the disclosure.

FIG. 18 is a perspective view of a reflector unit according to an alternative exemplary embodiment of the disclosure.

Figure 19:
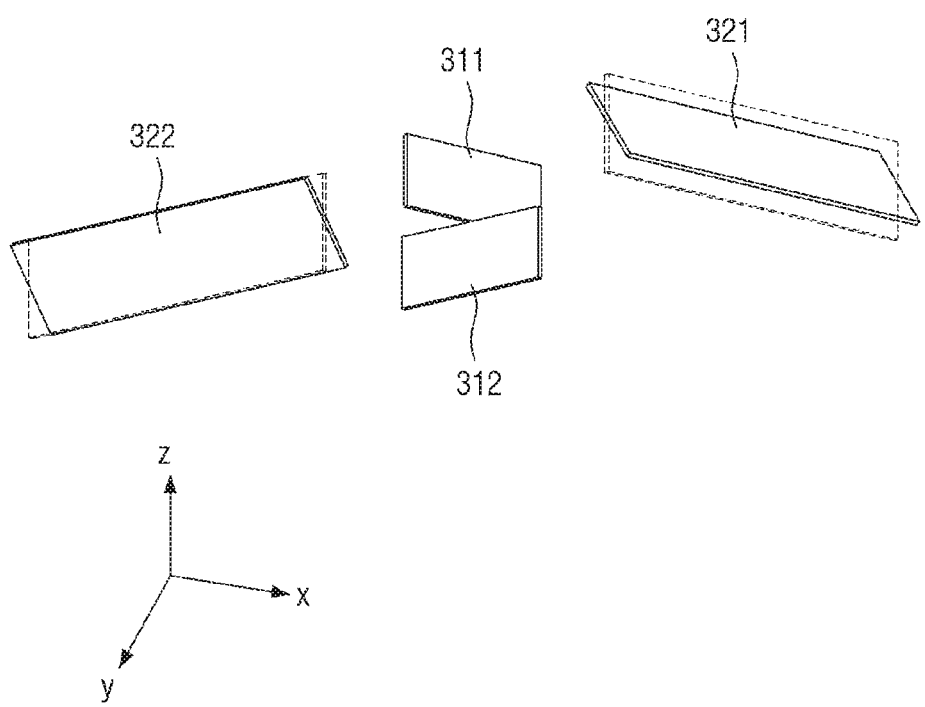
FIG. 19 is a perspective view of a reflector unit according to another alternative exemplary embodiment of the disclosure.

FIG. 19 is a perspective view of a reflector unit according to another alternative exemplary embodiment of the disclosure.

Figure 20:
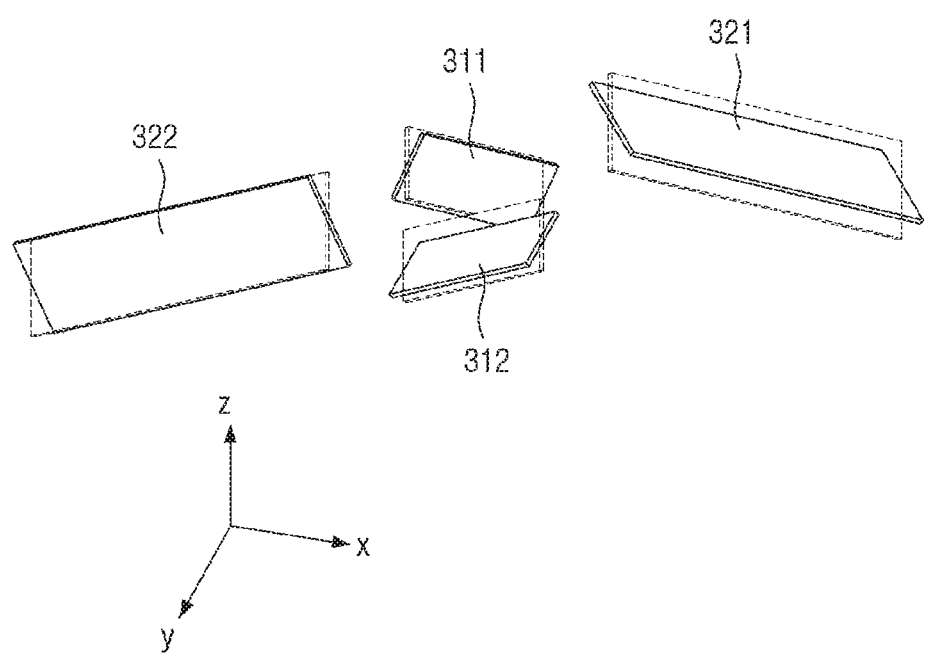
FIG. 20 is a perspective view of a reflector unit according to yet another alternative exemplary embodiment of the disclosure.

FIG. 20 is a perspective view of a reflector unit according to yet another alternative exemplary embodiment of the disclosure.

An exemplary embodiment of the reflector unit 300 may be disposed to have an inclination with respect to the yz plane. By adjusting the inclination of the reflector unit 300 on the yz plane in a way such that the path of the laser beam by the inclination of the first galvano mirror 111 is compensated, the third sub-scanning line SSL3 and the fourth sub-scanning line SSL4 may be in line with each other in the first direction (y-axis direction).

Referring to FIG. 18, in an alternative exemplary embodiment, the first mirror 311 and the second mirror 312 may be disposed in a way such that the first mirror 311 and the second mirror 312 have an inclination on the yx plane. In such an embodiment, the upper surfaces of the first mirror 311 and the second mirror 312 may face each other.

Referring to FIG. 19, in another alternative exemplary embodiment, the third mirror 321 and the fourth mirror 322 may be disposed in a way such that the third mirror 321 and the fourth mirror 322 have an inclination on the yz plane. In such an embodiment, the lower surfaces of the third mirror 321 and the fourth mirror 322 may face each other.

Referring to FIG. 20, in another alternative exemplary embodiment, the first mirror 311, the second mirror 312, the third mirror 321 and the fourth mirror 322 may be disposed in a way such that the first mirror 311, the second mirror 312, the third mirror 321 and the fourth mirror 322 have an inclination on the yz plane. In such an embodiment, the upper surfaces of the first mirror 311 and the second mirror 312 may face each other, and the third mirror 321 and the fourth mirror 322 may face each other.

Referring to FIG. 18, 19 or 20, in an exemplary embodiment, the path of the laser beam L in the first direction (y-axis direction) by the inclination of the first galvano mirror 111 may be compensated for. In such an embodiment, the paths of the first, second and third laser beams L1, L2 and L3 and the fourth, fifth and sixth laser beams L4, L5 and L6, which are spaced apart in the first direction (y-direction), are changed by the reflector unit 300 in the first direction (y-direction), such that the points PM1, PM2, PM3, PM4, PM5 and PM6 may be placed on the straight line on the substrate S.

In exemplary embodiments of the laser processing apparatus 10, as described herein, the area that can be process with a laser may be effectively expanded in one direction.

Although the exemplary embodiments of the disclosure have been described with reference to the accompanying drawings, those skilled in the art would understand that various modifications and alterations may be made without departing from the technical idea or essential features of the disclosure. Therefore, it should be understood that the above-mentioned embodiments are not limiting but illustrative in all aspects.

What is claimed is:

1. A laser processing apparatus comprising:
   a laser source which generates a laser beam;
   a scanner disposed in an optical path of the laser beam from the laser source, wherein the scanner adjusts the optical path of the laser beam from the laser source in a first direction or in a second direction different from the first direction; and
   a reflector disposed in an optical path of the laser beam adjusted by the scanner, wherein the reflector reflects the laser beam adjusted by the scanner,
   wherein the reflector comprises:
   a first sub-reflector which shifts an optical path of the laser beam adjusted by the scanner in the first direction; and
   a second sub-reflector which shifts the optical path of the laser beam adjusted by the scanner in a third direction opposite to the first direction,
   wherein the apparatus further comprises:
   a stage, onto which the laser beam reflected by the reflector is incident, the stage including a surface facing the reflector; and
   an F-theta lens which adjusts a focal distance of the laser beam to be constant,
   wherein the F-theta lens is disposed between the reflector and the scanner in a direction perpendicular to the surface of the stage, and
   wherein the F-theta lens overlaps the first sub-reflector and the second sub-reflector in the direction perpendicular to the surface of the stage.

2. The apparatus of claim 1, wherein the first sub-reflector comprises:
   a first mirror which reflects the laser beam adjusted by the scanner, and
   a second mirror which reflects the laser beam reflected by the first mirror.

3. The apparatus of claim 2, wherein the first mirror and the second mirror are disposed in parallel to each other.

4. The apparatus of claim 1,
   wherein the first sub-reflector has an inclination of about 45° with respect to the surface of the stage.

5. The apparatus of claim 1, wherein the second sub-reflector comprises:
   a third mirror which reflects the laser beam adjusted by the scanner; and
   a fourth mirror which reflects the laser beam reflected by the third mirror.

6. The apparatus of claim 5, wherein the third mirror and the fourth mirror are disposed in parallel to each other.

7. The apparatus of claim 1,
   wherein the second sub-reflector has an inclination of about 45° with respect to the surface of the stage.

8. The apparatus of claim 1, wherein the first sub-reflector and the second sub-reflector have inclinations in opposite directions, respectively.

9. The apparatus of claim 1,
   wherein a height of the laser source from the stage is equal to a height of the scanner from the stage.

10. The apparatus of claim 1,
    wherein the reflector is disposed between the scanner and the stage.

* * * * *